United States Patent [19]

Benoit

[11] Patent Number: 4,694,519
[45] Date of Patent: Sep. 22, 1987

[54] CORNER BRACKET

[75] Inventor: Roland A. Benoit, Danielson, Conn.

[73] Assignee: Gem Industries, Inc., Gardner, Mass.

[21] Appl. No.: 904,708

[22] Filed: Sep. 8, 1986

[51] Int. Cl.⁴ .............................................. A47C 19/00
[52] U.S. Cl. .................................... 5/200 C; 5/282 R; 403/403; 403/205
[58] Field of Search ...................... 403/403, 205, 402; 5/201, 282 R, 200 R, 200 C

[56] References Cited

U.S. PATENT DOCUMENTS 1,286,087  11/1918  Petus et al. ................... 5/282 R UX
2,567,619   9/1951  Rosenfeld ........................ 5/200 R X
2,721,338  10/1955  Resnick ............................. 5/201 X

FOREIGN PATENT DOCUMENTS 1139255  1/1969  United Kingdom ............... 403/402

Primary Examiner—Andrew V. Kundrat
Attorney, Agent, or Firm—Charles R. Fay

[57] ABSTRACT

A corner bracket for a spring mattress support into which the ends of two angle irons are set at a right angle, and parts of the bracket are bent and crimped over onto the angle irons to secure these parts together with no actual fasteners.

11 Claims, 6 Drawing Figures

CORNER BRACKET

FIELD OF THE INVENTION

Corner brackets that secure together the angle irons for a mattress supporting spring frame.

BACKGROUND OF THE INVENTION

Mattress supporting spring frames in the form of four corner connected angle irons are old and well-known. They are e.g. used universally in childs' cribs. The design of such a frame is relatively simple—the end portions of two side and two end angle irons are riveted together to form a rectangular open frame that mounts the spring fabric. Angle irons are used because they are inexpensive and available, and the mattress may find support at its edges and head and foot on the horizontal flanges of the angle irons, while the vertical flanges stiffen the angle irons against deflection under weight of the mattress and the occupant. Improvement is always looked for, in expense as well as safety and comfort, and the present invention provides rounded corners (safer), eliminates all rivets, and aids in easier, faster, and cheaper handling and assembly.

SUMMARY OF THE DISCLOSURE

Instead of directly riveting the angle iron end portions, a specially formed bracket is provided to snugly receive the adjacent end portions of e.g. a side angle iron and an end angle iron at a right angle and in spaced relation with respect to each other. The novel bracket is of channel shape and has three main parts: a central curved part that separates the ends of the angle irons and two straight end parts that accept and hold the end portions of the angle irons at right angles to each other with the vertical flanges at the outside aspects of the spring frame and the horizontal flanges being coplanar and extending inwardly with respect to the frame. Each bracket is generally V-shaped and has a relatively long (or wide) flange covering the vertical flanges of the angle irons and a shorter flange covering the edges of the horizontal flanges of the angle iron. The longer bracket flange is straight and the shorter bracket flange is in the form of a lip on the bottom of the channel, and is bent at a right angle to cause this part of the bracket to just accept the horizontal angle iron flange. Each bracket has two inwardly directed dimples socketing in apertures in the horizontal flanges of the angle irons to locate the same and to assist in holding the parts together after the edge portions of the bracket, flanges, which extend past the respective flanges of the angle irons, are very forcibly clamped or crimped about the edges of these angle iron flanges, clamping the parts solidly together with the dimples in the apertures. No actual fasteners are used; rivets, bolts, etc. are completely avoided.

Each bracket may have a third dimple facing oppositely to the above described location simply to faciliate stacking the frames in alignment after assembly with the angle irons.

PREFERRED EMBODIMENTS OF THE INVENTION

Figure 1:
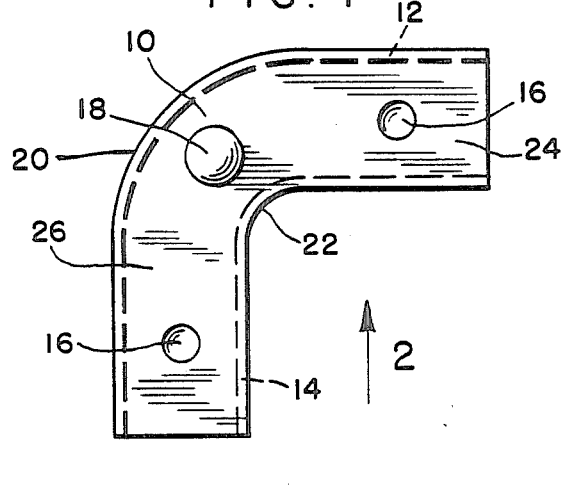
FIG. 1 is a top plan view of the bracket per se.

The new corner bracket is shown in FIGS. 1-5 inclusive as it is originally made, a kind of arc shaped channel iron has a top 10 and a longer or wider flange 12 along one edge and a shorter narrower flange 14 along the opposite edge. The top 10 is also referred to as the bottom, but in practise the member 10 is on the upper, mattress facing side of the spring frame. The spring fabric is not shown as it is completely conventional. Dimples 16 extend down from the part 10 i.e. inwardly of the bracket and single dimple 18 extends oppositely.

The bracket being of arc shape has its center curved as at 20 for the outer aspect and 22 for the inner aspect. The curve is 90° and forms two short straight members 24 and 26 as the ends of the bracket. These ends are open and receive the adjacent end portions of angle iron parts that will borm a head or foot and a side of the spring frame. The straight ends of the bracket are at a right angle and position the angle irons 32 and 34 FIG. 5. at a right andle. The irons being thrust into the respective bracket ends. The irons are pre-punched at a particular distance in from their ends and the dimples 16 snap into the punched holes, indicated at 36 FIG. 5. Each angle iron has a vertical flange 38 and a horizontal flange 40.

Figure 2:
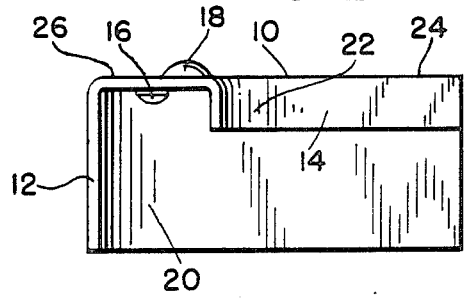
FIG. 2 is an elevational view looking in the direction of arrow 2 in FIG. 1.
Figure 3:
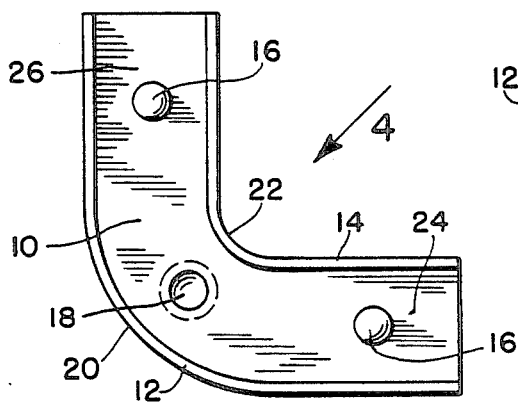
FIG. 3 is a bottom plan view of the bracket.
Figure 4:
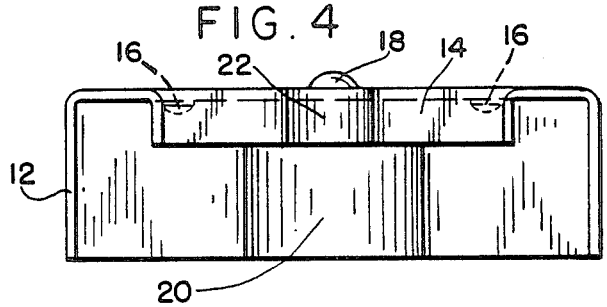
FIG. 4 is an elevational view looking in the direction of arrow 4 in FIG. 3.
Figure 5:
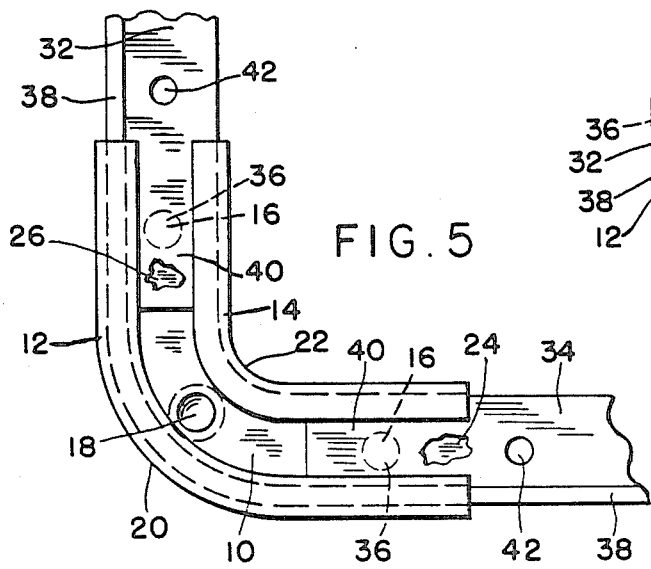
FIG. 5 is a view similar to FIG. 3 but shows the adjacent ends of a head or foot and a side angle iron in the corner bracket as positioned by the dimples therein.
Figure 6:
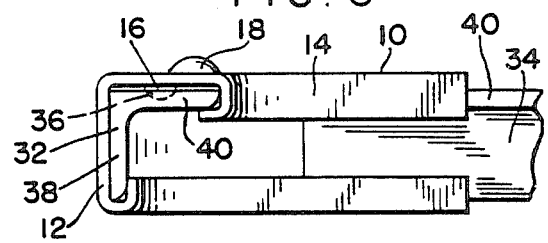
FIG. 6 is a view similar to FIG. 2, but with the angle irons crimped and the corner finished.

The angle irons are shown in place in the bracket in FIG. 5, see also FIG. 2. Once so positioned, the overhanging portions of both short and long flanges, see FIG. 2, are very firmly crimped over the edges of the two flanges of each angle iron, see FIG. 6. The side flanges of the bracket as made overlaps the angle iron flanges sufficient to provide a strong base for the crimping action. Once crimped, the dimples 16 in their corresponding punched holes 36 provide an additional mechanical lock to aid in securing the bracket to the angle irons. There are of course form brackets for each mattress supporting spring frame. The angle irons are also additionally punched to serve as anchors for the usual coil springs as is indicated at 42 in FIG. 5. The dimples 18 face up, the dimples 16 face down. The dimples 18 are used to aid in stacking the frames after assembly.

I claim:

1. A corner bracket for a spring frame of a mattress support comprising a metallic channel in arc form including a bend and two straight portions at a right angle to each other, the channel having a bottom and a flange at each of the edges thereof, the bottom being generally flat and curved in conformance with the bottom of the channel, the flanges being of differing extent from the bottom,
the straight portions of the bracket separately receive the end portions of two angle irons, each angle iron having a horizontal flange and a vertical flange,
the vertical flanges of the angle irons flatly contact the wider flange of the bracket and the horizontal flanges of the angle irons flatly contact the bottom of the bracket, the shorter flange is an inturned lip on the free edge of the bottom, and the horizontal flanges of the angle irons extend from the lip to the vertical angle iron flanges, the lip being crimped over the free edge of the horizontal flange of the angle iron.

2. The corner bracket of claim 1 including a dimple in each straight portion of the bottom.

3. The corner bracket of claim 2 wherein the dimples extend in the same direction as the flanges.

4. The corner bracket of claim 1 wherein the wider flange thereof extends beyond the vertical flanges of the angle irons.

5. The corner bracket of claim 1 wherein the wider flange of the bracket is crimped over the free edge of the vertical flange of the angle iron.

6. A mattress supporting spring frame comprising two side angle irons, two end angle irons, and four interconnecting brackets securing the four angle irons together forming an open rectangular frame, each angle iron including a vertical flange and a horizontal flange, the horizontal flanges being co-planar, each bracket comprising a channel having a bottom and a flange at each edge, the bracket flanges being of unequal width, the channel being formed on an arc and being generally V-shaped, the bottom being co-planar and the wider bracket flange being at the outer aspect of the arc and the shorter bracket flange being at the inner aspect thereof, an angle iron end portion in each straight bracket part, the adjacent ends of the angle irons being spaced apart, means locating the angle irons in position relative to the bracket, the vertical flanges of the angle irons being in contact with the longer bracket flange at the inside aspect of the latter and outside aspect of the angle iron, the free edges of the horizontal angle iron flanges abutting the inside aspects of the shorter bracket flanges, the bracket flanges both extending beyond the corresponding bracket flanges, and the bracket flanges being crimped inwardly relative to the bracket over the adjacent edges of the angle iron flanges.

7. The frame of claim 6 wherein the means locating the angle irons in the bracket include dimples in the bracket and corresponding dimple receiving holes in the angle irons.

8. The frame of claim 7 including a third dimple in each bracket, the third dimple extending oppositely to the first named dimples.

9. The frame of claim 7 wherein the dimples are located on the bracket channel bottom and the dimple receiving holes are in the horizontal flanges of the angle irons.

10. The frame of claim 9 wherein there is a dimple in each straight bracket part.

11. A corner bracket for joining two angle irons at angles to each other to form a corner, the bracket comprising a metallic channel in arc form, the channel including a plane bottom and a flange at each side of the bottom, the flanges extending in the same direction and being generally spaced and parallel, a dimple and dimpler receiving means on and between each angle iron and the bracket, said dimple and its receiving means locating the angle irons relative to the bracket, the angle irons having flanges of less width than the heights of the bracket flanges, the latter being crimped over onto the angle iron flanges and together with the dimples securing the angle irons and bracket together.

* * * * *